(12) United States Patent
Zhu et al.

(10) Patent No.: US 11,175,472 B2
(45) Date of Patent: Nov. 16, 2021

(54) THREE-DIMENSIONAL DYNAMIC ADJUSTMENT AND LOCKING MECHANISM

(71) Applicant: The Institute of Optics and Electronics, The Chinese Academy of Sciences, Chengdu (CN)

(72) Inventors: Xianchang Zhu, Chengdu (CN); Jian Wang, Chengdu (CN); Lei Chen, Chengdu (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 0 days.

(21) Appl. No.: 16/626,684

(22) PCT Filed: Dec. 29, 2018

(86) PCT No.: PCT/CN2018/125479
§ 371 (c)(1),
(2) Date: Dec. 26, 2019

(87) PCT Pub. No.: WO2019/184516
PCT Pub. Date: Oct. 3, 2019

(65) Prior Publication Data
US 2021/0003804 A1    Jan. 7, 2021

(30) Foreign Application Priority Data
Mar. 28, 2018 (CN) .......................... 201810262320.2

(51) Int. Cl.
*G02B 7/00* (2021.01)
*G02B 7/04* (2021.01)

(52) U.S. Cl.
CPC ............... *G02B 7/003* (2013.01); *G02B 7/04* (2013.01)

(58) Field of Classification Search
CPC .......... G02B 7/003; G02B 7/04; G02B 7/004; G02B 7/005; G02B 7/00
(Continued)

(56) References Cited

U.S. PATENT DOCUMENTS 6,859,337 B2 * 2/2005 Oshino .................... G02B 7/00
359/813
7,139,137 B2 * 11/2006 Sudoh .................... G02B 7/023
359/811
(Continued)

FOREIGN PATENT DOCUMENTS

CN          1837897       9/2006
CN          101226345     7/2008
(Continued)

OTHER PUBLICATIONS

International Search Report in International Application No. PCT/CN2018/125479, dated Mar. 27, 2019, 3 pages.

*Primary Examiner* — William R Alexander
(74) *Attorney, Agent, or Firm* — Fish & Richardson P.C.

(57) ABSTRACT

Disclosed is a three-dimensional adjustment mechanism for performing precise adjustment of an optical element in a high-resolution imaging system. The three-dimensional adjustment mechanism includes three elastic adjustment members uniformly distributed to conduct an axial displacement adjustment and a tilt adjustment of the optical element. The three elastic adjustment members are uniformly arranged at a bottom of the optical element, and configured to perform dynamic adjustment for the optical element with high precision on basis of deformations of the elastic adjustment members.

4 Claims, 2 Drawing Sheets

(58) Field of Classification Search
USPC .......................................................... 359/811
See application file for complete search history.

(56) References Cited

U.S. PATENT DOCUMENTS

| | | | |
|---|---|---|---|
| 7,679,845 B2* | 3/2010 | Wang | G02B 7/023 |
| | | | 359/822 |
| 2003/0234989 A1* | 12/2003 | Oshino | G02B 7/00 |
| | | | 359/811 |
| 2005/0002011 A1* | 1/2005 | Sudoh | G03F 7/70825 |
| | | | 355/72 |
| 2008/0180819 A1* | 7/2008 | Wang | G02B 7/023 |
| | | | 359/822 |
| 2012/0063017 A1* | 3/2012 | Song | G02B 7/004 |
| | | | 359/822 |

FOREIGN PATENT DOCUMENTS

| | | |
|---|---|---|
| CN | 102141741 | 8/2011 |
| CN | 102289154 | 12/2011 |
| CN | 102565983 | 7/2012 |
| CN | 103698873 | 4/2014 |
| CN | 108398761 | 8/2018 |
| JP | 2016029414 | 3/2016 |

* cited by examiner

THREE-DIMENSIONAL DYNAMIC ADJUSTMENT AND LOCKING MECHANISM

CROSS-REFERENCE TO RELATED APPLICATIONS

This application is a U.S. National Phase application under 35 U.S.C. § 371 of International Patent Application No. PCT/CN2018/125479, filed Dec. 29, 2018, which claims priority to Chinese Application No. 201810262320.2, filed on Mar. 28, 2018. The entire contents of the parent applications are hereby incorporated by reference.

FIELD OF THE INVENTION

The present application relates to a precision mechanical device, particularly to a three-dimensional adjustment and locking mechanism for precise adjustment of an optical element.

BACKGROUND

With improving performance of an optical imaging system, further requirements are demanded on adjustment of optical elements: not only adjustment precision of the optical element is required to be micron or even sub-micron level; but also higher requirement is put forward for dynamic response time of an adjustment mechanism; and space arrangement of the adjustment mechanism is required to be compact.

In an embodiment, three elastic adjustment springs Z1, Z2, Z3 are evenly distributed at a bottom of an optical element to be adjusted, and the elastic adjustment springs are connected to the optical element by a central boss 10 as shown in FIG. 2. When the central boss 10 is driven from below in an up-and-down direction, it causes deformable springs on both sides of the central boss 10 to generate elastic deformation, thereby adjusting the optical element.

In the optical imaging system, a typical method of adjusting position of the optical element involves a displacement adjustment in a Z direction along an optical axis thereof and a tilt adjustment with respect to an X/Y direction. In order to correspondingly adjust the optical element, in a known mechanism, a linear guide is used to perform the displacement adjustment in the Z direction and a three-point wedge member is used to conduct the tilt adjustments of the optical element with respect to the X/Y direction. A combination of the linear guide with the three-point wedge member is used to adjust the position of the optical element.

In a high-resolution imaging optical system, there are some technical difficulties upon adjusting the position of the optical element by means of a combined adjustment mechanism including the combination of the linear guide with the wedge member: on the one hand, the combined adjustment mechanism would occupy a larger installation space, which is not consistent with the size requirements on compactness for the adjustment mechanism in the high-resolution imaging system; on the other hand, adjustment error in the combined adjustment mechanism does not meet the high-precision adjustment requirement of the optical element.

SUMMARY OF THE INVENTION

In order to solve the above described problems and achieve the precise adjustment of the optical element in the high-resolution imaging system, the present disclosure provides a three-dimensional adjustment mechanism, which performs a high-precision position adjustment of the optical element while only occupying a small space.

In an embodiment, a lever mechanism 20, as shown in FIG. 3, is used below each elastic adjustment member to achieve its deformation adjustment. When the lever mechanism 20 is driven laterally, a lever 21 therein rotates around a shaft 22 to turn a lateral displacement into vertical displacement, thereby causing the elastic adjustment member to deform in the up-and-down direction and completing the adjustment of the optical element. By adjusting horizontal and vertical force arms of the lever, a scaling ratio of the lever is adjusted so as to achieve high-precision adjustment of the adjustment mechanism.

A technical solution of the present disclosure is a three-dimensional adjustment mechanism which includes three elastic adjustment springs, and configured to perform a displacement adjustment in a Z direction and a tilt adjustment with respect to an X/Y direction on basis of deformations of the elastic adjustment springs. When adjusting the position in the Z direction along an optical axis thereof, the three elastic adjustment springs have same deformation amounts of h, and thus the combined adjustment mechanism has a Z-direction adjustment parameter being $$Z=(Z1+Z2+Z3)/3=h;$$

when performing tilt adjustment with respect to an X direction, Z3 remains unchanged, and both Z1 and Z2 have equal deformation amounts but in opposite directions, that is, Z1=h, Z2=−h, and an X-direction tilt adjustment parameter is:

$$\theta_x = \frac{Z_1 - Z_2}{\sqrt{3}R} = \frac{2h}{\sqrt{3}R};$$

when performing tilt adjustment with respect to the Y direction, Z1 and Z2 have the same deformation amounts and in the same direction, that is, Z1=Z2=h1; and Z3 has a deformation amount of Z3=h2, and an Y-direction tilt adjustment parameter is:

$$\theta_y = \frac{(Z_1 + Z_2)/2 - Z3}{1.5R} = \frac{h_1 - h_2}{1.5R};$$

where R is a radius of a circle where the three elastic adjustment members are uniformly distributed.

DETAILED DESCRIPTION OF PREFERRED EMBODIMENTS OF THE INVENTION

Figure 1:
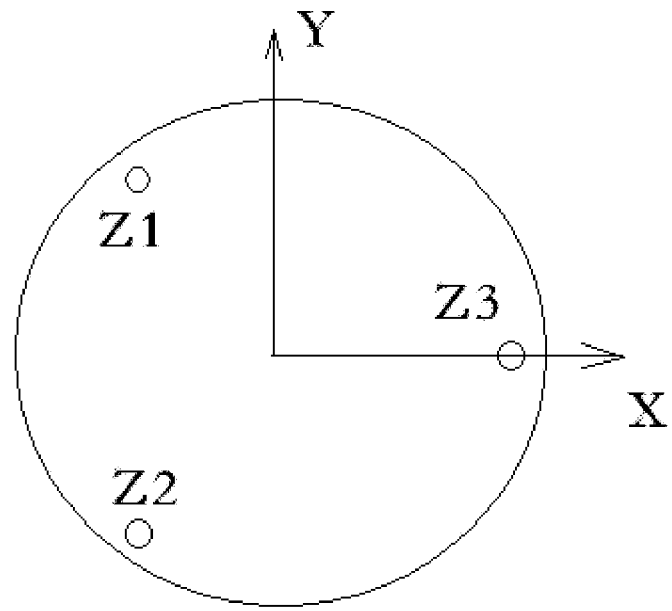
FIG. 1 is a schematic diagram showing a coordinate system where an adjustment mechanism is located and distribution of elastic adjustment members.
Figure 2:
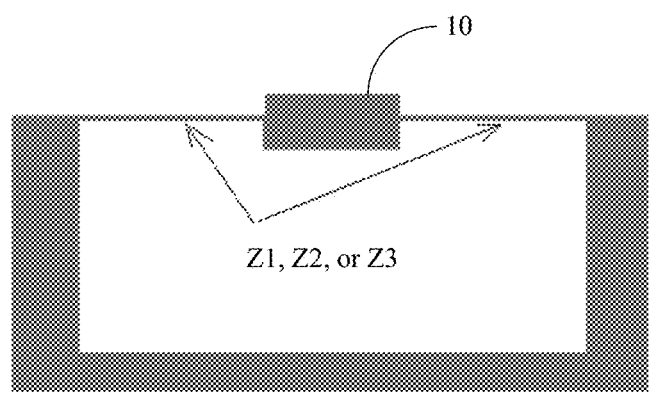
FIG. 2 shows the elastic adjustment member in the adjustment mechanism.

The adjustment mechanism according to the present disclosure will be further described with reference to the drawings. FIG. 1 is a schematic diagram showing a coordinate system where an adjustment mechanism is located and distribution of elastic adjustment members. FIG. 2 shows the elastic adjustment member in the adjustment mechanism.

In an embodiment, three elastic adjustment springs Z1, Z2, Z3 are evenly distributed at a bottom of an optical element to be adjusted, and the elastic adjustment springs are connected to the optical element by a central boss 10 as shown in FIG. 2. When the central boss 10 is driven from below in an up-and-down direction, it causes deformable springs on both sides of the central boss 10 to generate elastic deformation, thereby adjusting the optical element.

In an embodiment, when adjusting the optical element in the Z direction along the optical axis thereof, the three elastic adjustment members are adjusted so that driving forces at the three elastic adjustment members are the same, and the deformation amounts at the three elastic adjustment members are all equivalent to h. Thus, a Z-direction adjustment parameter of the adjustment mechanism is:

$$Z=(Z1+Z2+Z3)/3=h;$$

When performing tilt adjustment with respect to the X direction, Z3 remains unchanged, and Z1 and Z2 have equal deformation amounts but in opposite directions, that is, Z1=h, Z2=−h. Thus, an X-direction tilt adjustment parameter is $$\theta_x = \frac{Z_1 - Z_2}{\sqrt{3}\,R} = \frac{2h}{\sqrt{3}\,R};$$

When performing tilt adjustment with respect to the Y direction, Z1 and Z2 have the same deformation amounts with the same direction, that is, Z1=Z2=h1; and Z3 has a deformation amount of Z3=h2. Thus, a Y-direction tilt adjustment parameter is:

$$\theta_y = \frac{(Z_1 + Z_2)/2 - Z3}{1.5R} = \frac{h_1 - h_2}{1.5R},$$

where R is a radius of a circle where the three elastic adjustment members are uniformly distributed.

Figure 3:
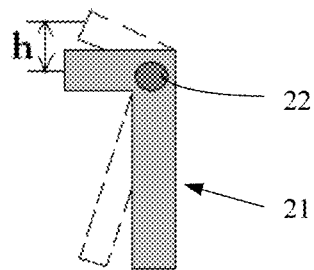
FIG. 3 is a schematic diagram showing a principle of lever driving in the adjustment mechanism.

In an embodiment, a lever mechanism 20, as shown in FIG. 3, is used below each elastic adjustment member to achieve its deformation adjustment. When the lever mechanism 20 is driven laterally, a lever 21 therein rotates around a shaft 22 to turn a lateral displacement into vertical displacement, thereby causing the elastic adjustment member to deform in the up-and-down direction and completing the adjustment of the optical element. By adjusting horizontal and vertical force arms of the lever, a scaling ratio of the lever is adjusted so as to achieve high-precision adjustment of the adjustment mechanism.

What is claimed is:

1. A three-dimensional adjustment mechanism for precise adjustment of an optical element in a high-resolution imaging system, comprising three uniformly distributed elastic adjustment members to perform an axial displacement adjustment and a tilt adjustment of the optical element, the three elastic adjustment members being uniformly arranged at a bottom of the optical element, and the three-dimensional adjustment mechanism being configured to perform dynamic adjustment for the optical element with high precision on basis of deformations of the elastic adjustment members; wherein the deformations of the three elastic adjustment members are used for performing the adjustment, wherein when Z1, Z2, and Z3 of the three elastic adjustment mechanisms have the same deformation amounts, optical element is adjusted in a Z direction along an optical axis of the optical element;

when Z3 remains unchanged and Z1 and Z2 have equal deformation amounts but in opposite directions, a tilt adjustment with respect to an X direction is performed; and when Z1 and Z2 have equal deformation amounts with same direction and Z3 has a different deformation amount from that of Z1 or Z2, a tilt adjustment with respect to a Y direction is performed.

2. The three-dimensional adjustment mechanism of claim 1, wherein:

the three elastic adjustment members are configured to be deformed by driving the three elastic adjustment members by corresponding level mechanisms, so as to complete the adjustment.

3. A three-dimensional adjustment mechanism for precise adjustment of an optical element in a high-resolution imaging system, comprising three uniformly distributed elastic adjustment members to perform an axial displacement adjustment and a tilt adjustment of the optical element, the three elastic adjustment members being uniformly arranged at a bottom of the optical element, and the three-dimensional adjustment mechanism being configured to perform dynamic adjustment for the optical element with high precision on basis of deformations of the elastic adjustment members;

wherein:

the three elastic adjustment members are synchronously driven for adjustment, wherein when performing adjustment in a Z direction along an optical axis of the optical element, the three elastic adjustment members have the same deformation amounts of h, and a Z-direction adjustment parameter is Z=(Z1+Z2+Z3)/3=h;

when performing tilt adjustment with respect to an X direction, Z3 remains unchanged, and Z1 and Z2 have equal deformation amounts but in opposite directions, that is, Z1=h, Z2=h, and an X-direction tilt adjustment parameter is $$\theta_x = \frac{Z_1 - Z_2}{\sqrt{3}\,R} = \frac{2h}{\sqrt{3}\,R};$$

when performing tilt adjustment with respect to the Y direction, Z1 and Z2 have the same deformation amounts with same direction, that is, Z1=Z2=h1; and Z3 has a deformation amount of Z3=h2, and an Y-direction tilt adjustment parameter is $$\theta_y = \frac{(Z_1 + Z_2)/2 - Z3}{1.5R} = \frac{h_1 - h_2}{1.5R},$$

where R is a radius of a circle where the three elastic adjustment members are uniformly distributed.

4. The three-dimensional adjustment mechanism of claim 3, wherein:

the three elastic adjustment members are configured to be deformed by driving the three elastic adjustment members by corresponding level mechanisms, so as to complete the adjustment.

* * * * *